T. RHODUS.
VEHICLE WHEEL.
APPLICATION FILED MAY 19, 1917.

1,293,927.

Patented Feb. 11, 1919.
2 SHEETS—SHEET 1.

Witness:
John Enders

Inventor.
Thomas Rhodus,
by Robert Burns,
Atty.

T. RHODUS.
VEHICLE WHEEL.
APPLICATION FILED MAY 19, 1917.
1,293,927.
Patented Feb. 11, 1919.
2 SHEETS—SHEET 2.
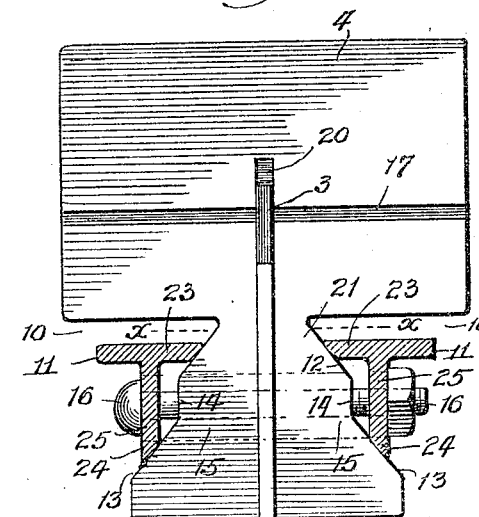
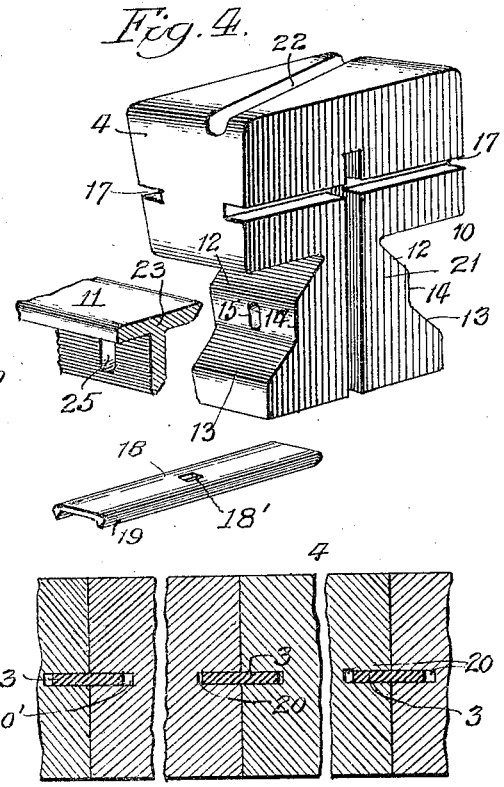
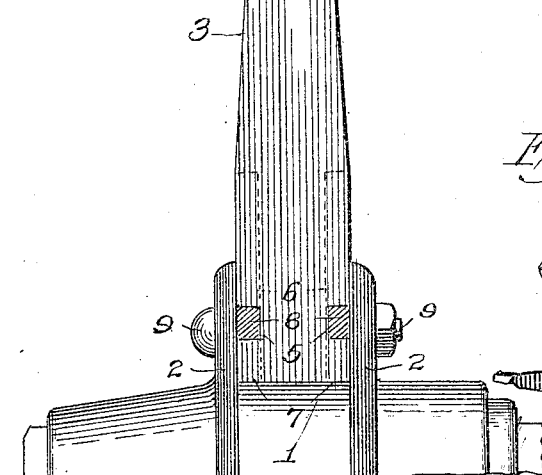
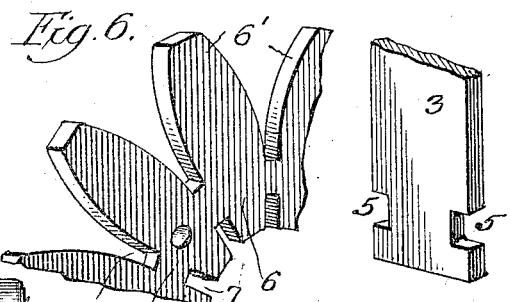
Witness:
John Enders
Inventor:
Thomas Rhodus,
by Robert Burns,
Atty.

UNITED STATES PATENT OFFICE.

THOMAS RHODUS, OF CHICAGO, ILLINOIS, ASSIGNOR TO CHARLOTTE C. RHODUS, OF CHICAGO, ILLINOIS.

VEHICLE-WHEEL.

1,293,927.     Specification of Letters Patent.     Patented Feb. 11, 1919.

Application filed May 19, 1917. Serial No. 169,606.

*To all whom it may concern:*

Be it known that I, THOMAS RHODUS, a citizen of the United States of America, and a resident of Chicago, in the county of Cook, State of Illinois, have invented certain new and useful Improvements in Vehicle-Wheels, of which the following is a specification.

This invention relates to that type of vehicle wheels in which the annular tread member is rigid and is yieldingly connected to an inner or hub member by resilient intermediate means, and has for its object:

To provide a means for connecting together and tightening the series of sections or blocks comprising the annular tread member of the wheel, in an effective and very substantial manner.

To provide means for individually connecting the series of sectors or blocks comprising the annular tread member of the wheel together in assembled relation, capable of ready disassembly when required, and with which the fastening means is locked in place against accidental disengagement.

In the accompanying drawings:

Fig. 3, is an enlarged detail transverse section.

Fig. 4, is a detached perspective view of associated parts of the annular tread member.

Fig. 5, is a detail circumferential section on line *x—x*, Fig. 3.

Fig. 6, is a detached perspective view illustrating the connection between a spoke and the hub portion of the wheel.

The same reference numerals indicate like parts in the several views.

Figure 1:
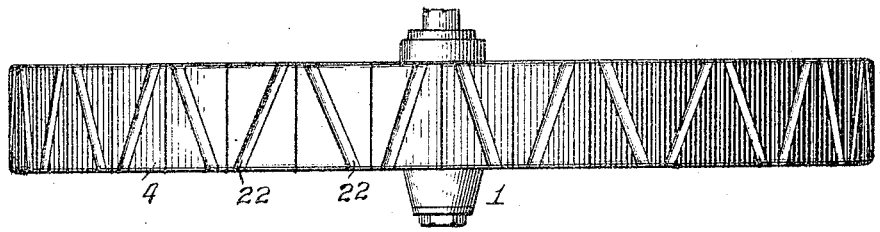
Figure 1, is a plan view of the wheel structure.
Figure 2:
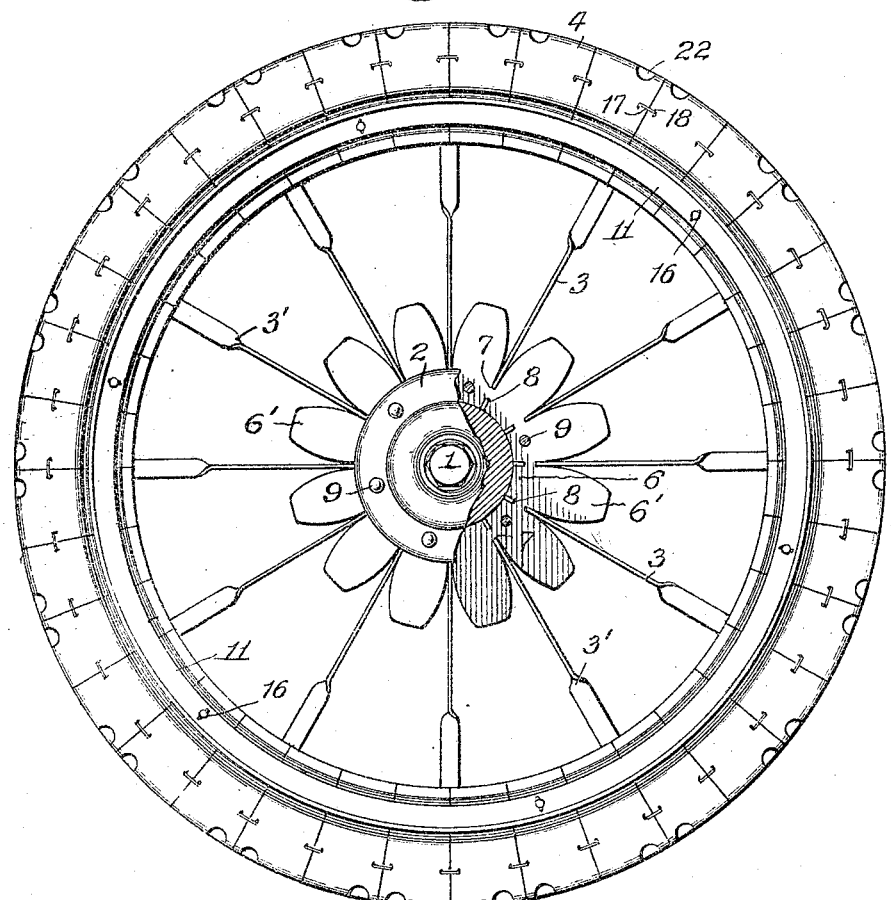
Fig. 2, is an elevation of the same, with parts broken away and in section to show the inner structure of the hub member.

Referring to the drawings, 1 designates the hub or inner member of the wheel structure, which is preferably formed with a pair of spaced collars or circular flanges 2 between which the inner ends of the series of resilient spokes 3 are clamped and held. As usual, one flange is integrally or otherwise fixed on the main portion of the hub while the other flange is detachably associated with said main portion of the hub.

The resilient spokes 3 are formed of bars or strips of resilient material, preferably spring steel, and constitute the resilient means by which the wheel tread 4 is operatively associated with the wheel hub 1 to absorb the varying impacts to which the wheel tread is exposed in use upon roadways. In the structure shown said spokes 3 are formed with a quarter twist 3' intermediate their length, with a view to localize flexure in a circular path to the inner portions of the spokes.

One part of the present invention involves means for effecting a substantial and readily detachable connection between the hub 1 and the inner ends of the spokes 3, and comprises a detail structural formation of parts as follows:—

5 designates a pair of opposed notches or recesses formed in the opposite edges of the spokes 3 and near the inner ends of the same.

6 designates a pair of annular plates or disks arranged inside the collars or flanges 2 of the hub, and formed with central orifices adapted to fit the central cylindrical periphery of the hub 1, as shown in Fig. 3. In the structure shown each of the disks 6 is formed with circular series of inner and outer notches or recesses 7, separated by a series of intermediate bars or webs 8, the arrangement being radial as shown. The bars or webs 8 are of a size corresponding with the before described notches 5 of the spokes, and fit the same in an engaged condition of the parts, as shown in Fig. 3. With the described construction a simple and substantial attachment of the parts is attained, and the usual transverse holding bolts 9 are utilized as the means for securing the parts in assembled relation, while permitting a ready disassembly when required.

6' designates circular series of bearing lugs associated with the wheel hub and arranged between the inner portions of the wheel spokes, and preferably formed as integral extensions of the aforesaid annular plates 6 as shown. The faces of the bearing lugs 6' adapted for bearing contact with the wheel spokes, are curved or otherwise formed to provide a progressive increase in resistance to flexure of the spokes as the same are flexed under an imposed load.

In the present structure the tread member 4 aforesaid, comprises a plurality of sector shape sections or blocks, formed of any usual and suitable wear-resisting material, with their abutting portions formed with adjoining contact faces preferably arranged on lines radial with the axis of the wheel structure, and another part of the present improvement involves a structural formation of the individual sections or blocks, as follows:—

10 designates recesses or grooves formed in the opposite sides of each section or block aforesaid, for engagement with the pair of opposed clamping and holding rings 11 hereinafter described in detail, and the depth of said recesses is preferably greater than the width of its associating ring 11 so that the series of tread sections or blocks may overhang and protect said rings, as illustrated more particularly in Fig. 3. In the most effective form of the recesses or grooves 10, the bearing faces thereof are formed with inner and outer inclined or wedge shape bearing portions 12 and 13, separated by an intermediate and preferably plane surface 14, as shown.

15 designates radially elongated transverse passages in the circular tread structure, and formed in more or less of the individual tread sections or blocks, to receive the transverse bolts 16, by which the associated parts of the tread member 4 are adjusted and clamped together. The elongated passages 15 are preferably formed in the recesses or grooves 10 of the tread sections or blocks so as to connect grooves 10 through the blocks in line with the plane surfaces 14 and intermediate of the inclined or wedge shaped bearing surfaces 12 and 13 of said blocks as shown in Fig. 3.

17 designates transverse grooves or channels formed in the before described abutting faces of the series of tread sections or blocks, with pairs of said grooves or channels in register to receive transverse key bars 18 adapted to be driven transversely into place to hold the series of tread blocks in assembled relation in cases where the holding rings 11 aforesaid, are removed in making repairs, replacements, etc. In the preferred construction, each of the key bars 18 is formed with sharp side edges or flanges 19 adapted to bite into the material of the tread sections or blocks, as the key bars are driven laterally into place to effect a strong connection.

18' designates an elongated orifice formed at the mid-length of a key bar 18, adapted to receive the outer end of a wheel spoke 3 when the parts are in assembled relation and prevents accidental disengagement of said key bar.

20 designates radial slots formed in more or less of the tread sections or blocks, and preferably in the adjoining contact faces of said blocks, so that the individual slot in one block will register with a like individual slot in an adjoining block, to constitute a single receiving slot for the outer end of a spoke 3 of the structure. The radial slots 20 are formed in the mid-width of the tread blocks and are separated from the before described inclined outer sides of the same by intervening walls 21, so that the radial movement of the spokes may take place without frictional interference on the part of the pair of holding rings 11 above described. Said slots 20 extend a distance outward and beyond the outer ends of the spokes 3, so that there may be independent radial movement of the parts in actual use, and more especially in the case of the spokes, as they assume a vertical and approximately vertical position, and so that the load imposed will be wholly assumed by such spokes as are not in a vertical position, with the aforesaid vertical spokes free to move in their recesses without taking any of the load.

Another part of the present improvement consists in making some, and preferably alternate slots 20' of a greater width than the companion slots 20, with a view to permit a corresponding sidewise independent movement of the spokes in said wider slots before a bearing is reached with a side of a wider slot 20'. The purpose or function is to have the spokes in the narrower slots 20 assume the lighter loads imposed in actual use, and with a maximum load imposed to have both the spokes of the narrower and wider slots assume such load.

22 designates individual grooves or scores formed in the tread surface of each individual tread section or block aforesaid, with a view to provide increased traction or adhesion in actual use, and to such end the grooves or scores 22 will have an oblique arrangement, with the grooves of adjacent tread blocks having a converging disposition as illustrated more particularly in Fig. 1.

Each of the pair of opposed connecting and holding rings 11, heretofore referred to, is T-shape in cross-section, and is arranged to provide an outer transverse web 23 and a central inwardly extending web 24, with the inner ends of both webs 23, 24, formed for individual bearing upon the inclined bearing portions 12 and 13 of the tread sections or blocks, and with said bearings at the opposite sides of the transverse clamping bolts 16, as illustrated more particularly in Fig. 3. With the described construction, the outer portion of the transverse webs 23 overhangs the heads of the bolts 16, to protect the same from injury.

25 designates radially elongated slots in the webs 24 of the respective holding rings 11, and adapted to receive the bolts 16 aforesaid, in a manner which admits of independent radial movement of the parts as an adjustment of the same is made.

Having thus fully described my said invention what I claim as new and desire to secure by Letters Patent, is:

A block for wheel treads formed with a recess in each of two opposite sides, each recess having a wall extending from the deep part to the outer part of said recess, the said wall comprising an intermediate part between two frusto-conical surfaces substantially as set forth.

Signed at Chicago, Illinois, this 17th day of May, 1917.

THOMAS RHODUS.

Copies of this patent may be obtained for five cents each, by addressing the "Commissioner of Patents, Washington, D. C."